US012748269B2

(12) United States Patent
Lin et al.

(10) Patent No.: US 12,748,269 B2
(45) Date of Patent: Sep. 29, 2026

(54) IMAGE SENSING MODULE

(71) Applicant: CREATIVE SENSOR INC., Taipei City (TW)

(72) Inventors: Yi-Hsuan Lin, Taipei City (TW); Chi-Wen Chen, Taipei City (TW); Craig Thomas Johnson, San Diego, CA (US)

(73) Assignee: CREATIVE SENSOR INC., Taipei City (TW)

( * ) Notice: Subject to any disclaimer, the term of this patent is extended or adjusted under 35 U.S.C. 154(b) by 375 days.

(21) Appl. No.: 18/515,002

(22) Filed: Nov. 20, 2023

(65) Prior Publication Data

US 2025/0067943 A1 Feb. 27, 2025

(30) Foreign Application Priority Data

Aug. 21, 2023 (TW) ................................ 112131291

(51) Int. Cl.
*G02B 6/42* (2006.01)
*H04N 1/028* (2006.01)

(52) U.S. Cl.
CPC ....... *G02B 6/4204* (2013.01); *H04N 1/02895* (2013.01)

(58) Field of Classification Search
CPC .... G02B 6/4204; H10F 39/198; H10F 39/806
See application file for complete search history.

(56) References Cited

U.S. PATENT DOCUMENTS

2011/0242350 A1* 10/2011 Sawayama ............ H10F 77/413
257/E31.127

FOREIGN PATENT DOCUMENTS

| | | | |
|---|---|---|---|
| CN | 114092980 | A | 2/2022 |
| JP | H1093765 | A | 4/1998 |
| TW | 202208907 | A | 3/2022 |

OTHER PUBLICATIONS

Office Action dated Nov. 5, 2024 of the corresponding Japan patent application No. 2023-209061.
Office Action dated Jan. 3, 2024 of the corresponding Taiwan patent application No. 112131291.

* cited by examiner

*Primary Examiner* — Michael P Mooney
(74) *Attorney, Agent, or Firm* — HDLS IPR SERVICES; Chun-Ming Shih

(57) ABSTRACT

An image sensing module includes: a substrate; an optical sensing element disposed on the substrate; and a light-guide component disposed on the optical sensing element, and including a first light adjusting layer and a second light adjusting layer. The second light adjusting layer is disposed on the first light adjusting layer. The first light adjusting layer has a first light transmitting region, and the second light adjusting layer has a second light transmitting region. The first light transmitting region and the second light transmitting region are disposed corresponding to the optical sensing element.

18 Claims, 10 Drawing Sheets

2A

IMAGE SENSING MODULE

BACKGROUND OF THE DISCLOSURE

Technical Field

The present disclosure relates to a sensing module, particularly relates to an optical sensing module.

Description of Related Art

The contact image sensor (CIS) is a kind of linear image sensor, which is used to scan planar image or document into electronic format to facilitate storing, displaying, or transmitting. The CIS is mainly applied to scanner, facsimile machine, and multifunctional printer, etc.

The CIS works as below. A light generated by a light source irradiates to the document to be scanned, the light is reflected by the document, and the reflected light is focused by a lens assembly to the photosensitive element, such as charge-coupled device (CCD) or complementary metal oxide semiconductor (CMOS). The optical signal is changed to the electrical signal by the photosensitive element, and further changed to analog or digital pixel data.

The rod lens is mostly used in the related-art CIS for focusing and imaging the reflected light from the document to the CCD, and the analog or digital data is obtained after optical-to-electrical signal transformation. However, the imaging principle of the rod lens may cause limitation to depth of field (DOF) in imaging. In other words, the object to be scanned needs to be put extremely flat on the specific position. Further, in order to increase DOF, the volume of the rod lens or the image distance may need to be greatly increased, or the aperture may need to be decreased, thereby greatly increasing the cost and the volume of the product and the image sensing module.

In view of this, the inventors have devoted themselves to the aforementioned related art, researched intensively try to solve the aforementioned problems.

SUMMARY OF THE DISCLOSURE

The purpose of the disclosure is to provide an image sensing module, which may increase DOF in imaging, and decrease the volume and cost.

The disclosure provides an image sensing module includes: a substrate; an optical sensing element disposed on the substrate; and a light-guide component disposed on the optical sensing element, and including a first light adjusting layer and a second light adjusting layer. The second light adjusting layer is disposed on the first light adjusting layer. The first light adjusting layer has a first light transmitting region. The second light adjusting layer has a second light transmitting region. The first light transmitting region and the second light transmitting region are disposed corresponding to the optical sensing element.

In some embodiments, the image sensing module further includes: a lens layer disposed on the light-guide component, and including a lens element. The lens element is disposed corresponding to the optical sensing element, or disposed corresponding to the first light transmitting region and the second light transmitting region.

In some embodiments, the lens element is disposed corresponding to the optical sensing element.

In some embodiments, the lens layer includes a plurality of the lens elements, the lens elements are arranged alternately, and the optical sensing element is disposed corresponding to at least two of the lens elements.

In some embodiments, the first light transmitting region has a first aperture, the second light transmitting region has a second aperture, and the second aperture is equal to or greater than the first aperture.

In some embodiments, the first light adjusting layer and the second light adjusting layer are spaced by a first distance.

In some embodiments, the light-guide component further includes a third light adjusting layer disposed on the second light adjusting layer, the third light adjusting layer has a third light transmitting region, and the third light transmitting region is disposed corresponding to the optical sensing element.

In some embodiments, the first light transmitting region has a first aperture, the second light transmitting region has a second aperture, the third light transmitting region has a third aperture, the second aperture is equal to or greater than the first aperture, and the third aperture is equal to or greater than the second aperture.

In some embodiments, the first light adjusting layer and the second light adjusting layer are spaced by a first distance, and the second light adjusting layer and the third light adjusting layer are spaced by a second distance.

The disclosure provides the other image sensing module includes: a substrate: an optical sensing element disposed on the substrate: and a light-guide component disposed on the optical sensing element, and including a light adjusting structure. The light adjusting structure includes a plurality of light transmitting regions. The light transmitting regions are disposed corresponding to the optical sensing element. An aperture of each light transmitting region is gradually decreased along a light incident direction.

In some embodiments, the light adjusting structure includes a plurality of light adjusting layers, the light adjusting layers are arranged along the light incident direction, and the light transmitting regions are disposed on the light adjusting layers.

In some embodiments, two of the light adjusting layers adjacent to each other are spaced by a distance. A plurality of distances is in a predetermined ratio with one another.

The disclosure provides the other image sensing module includes: a substrate; an optical sensing element disposed on the substrate: and a light-guide component disposed on the optical sensing element, and including a light adjusting layer. The light adjusting layer includes a plurality of light transmitting regions and a light shielding region. The light shielding region is disposed on peripheries of the light transmitting regions. Each light transmitting region is disposed corresponding to the optical element.

In summary, the light-guide component of the image sensing module in the disclosure includes a light adjusting layer or a light adjusting structure, and the light adjusting layer or the light adjusting structure has a light transmitting region corresponding to the optical sensing element. As a result, with respect to the light adjusting layer or the light adjusting structure, only the light with specific angle may enter the optical sensing element. In other words, the image sensing module of the disclosure may shield stray light by the light adjusting layer or the light adjusting structure, and only allow the light with specific angle imaging (forming image) on the optical sensing element through the light transmitting region. Therefore, the image sensing module of the disclosure may effectively increase DOF in imaging for the optical sensing element. On the other hand, the light adjusting layer or the light adjusting structure of the disclosure may be formed on the optical sensing element, for example, by semiconductor manufacturing process, thereby further decreasing overall volume and manufacturing cost.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

As used in the present disclosure, terms such as “first”, “second”, “third”, “fourth”, and “fifth” are employed to describe various elements, components, regions, layers, and/or parts. These terms should not be construed as limitations on the mentioned elements, components, regions, layers, and/or parts. Instead, they are used merely for distinguishing one element, component, region, layer, or part from another. Unless explicitly indicated in the context, the usage of terms such as “first”, “second”, “third”, “fourth”, and “fifth” does not imply any specific sequence or order.

Figure 1:
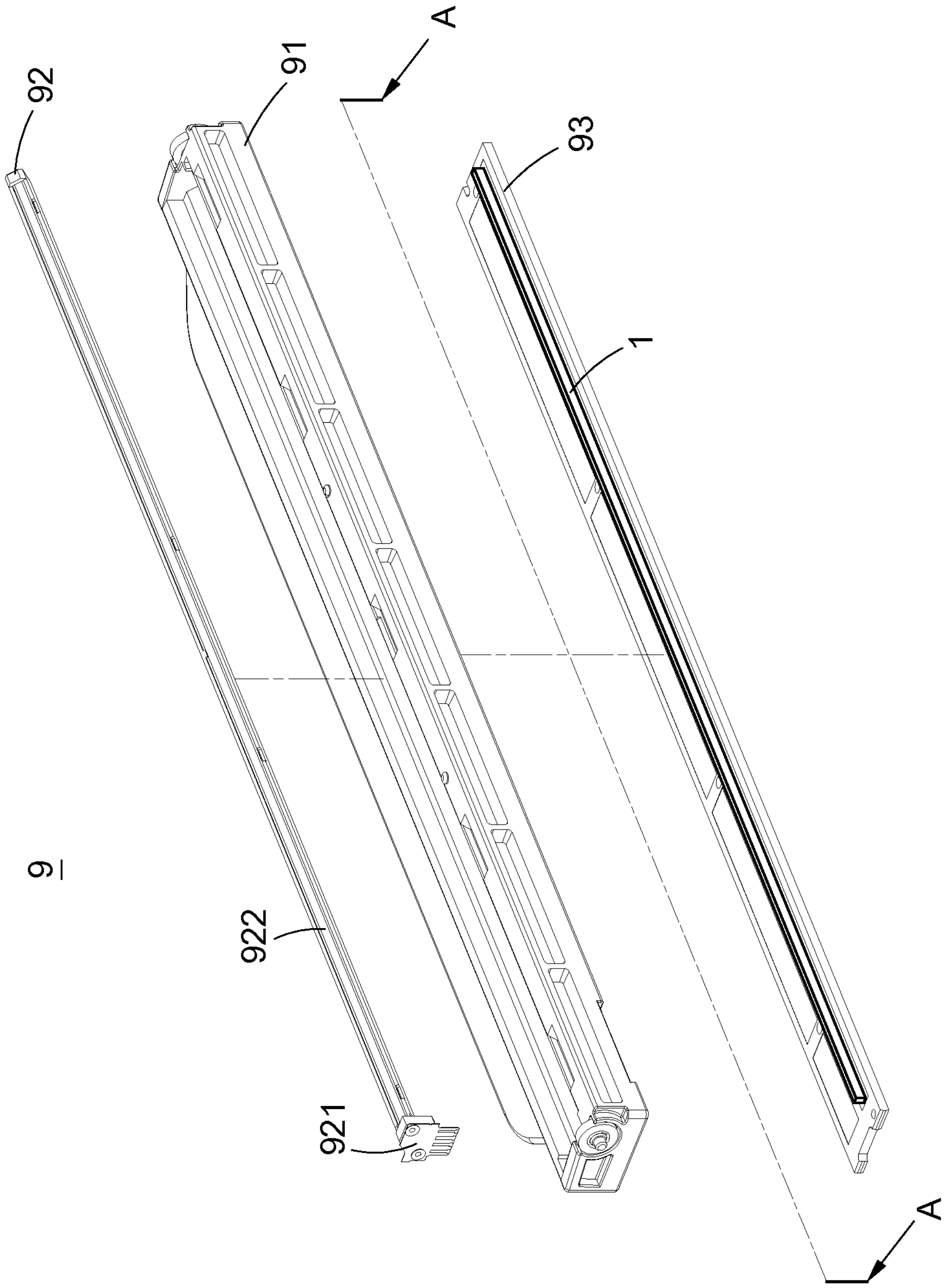
FIG. 1 is a schematic diagram of an image sensor device of the disclosure.
Figure 2:
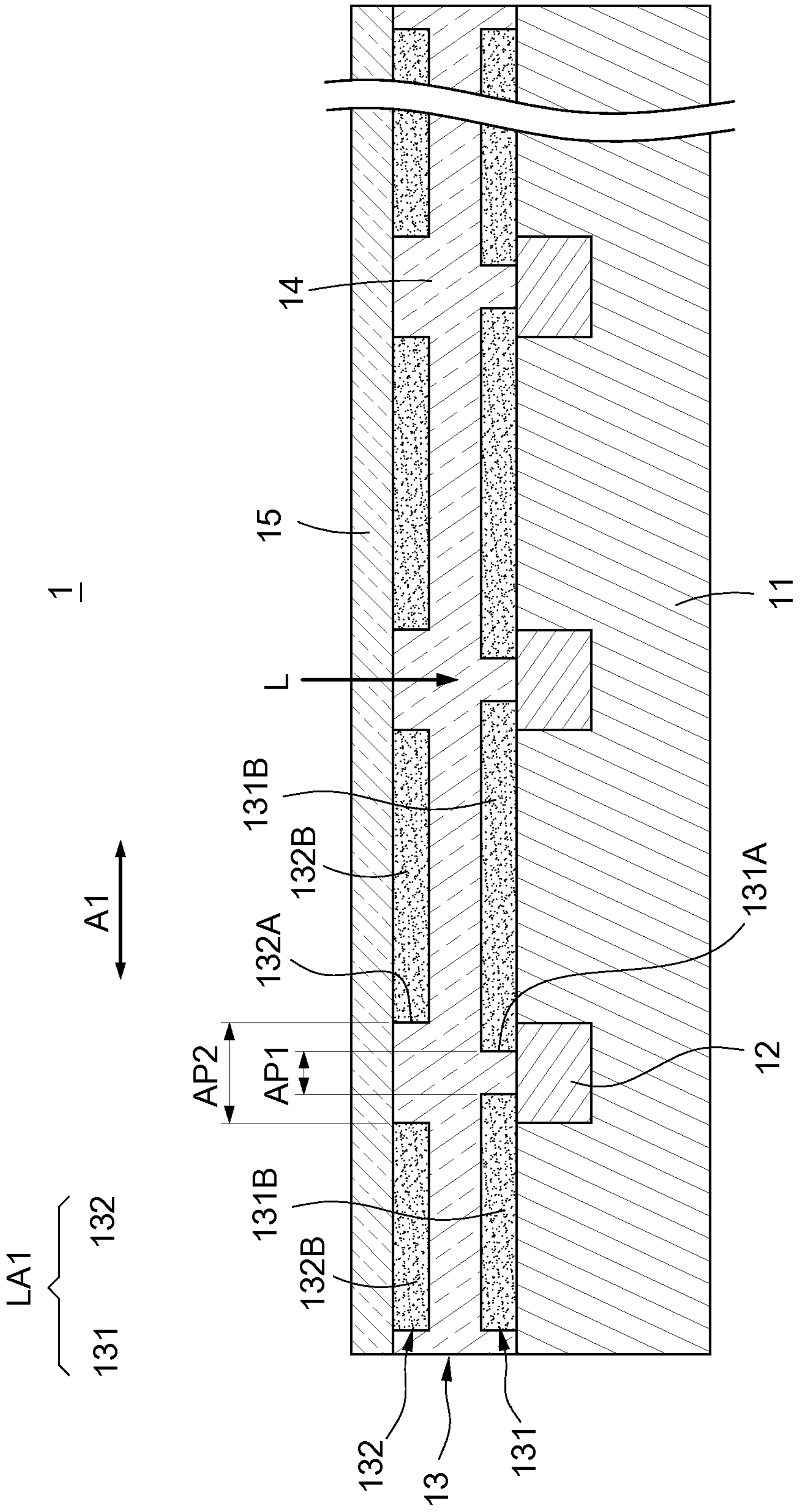
FIG. 2 is a cross-sectional diagram of an image sensing module in the first embodiment of the disclosure along the line A-A in FIG. 1.

FIG. 1 is a schematic diagram of an image sensor device 9 of the disclosure. FIG. 2 is a cross-sectional diagram of the image sensing module 1 in the first embodiment of the disclosure along the line A-A in FIG. 1.

As shown in FIG. 1 and FIG. 2, the image sensor device 9, for example, may include a casing 91, a light source module 92, a circuit board 93, and the image sensing module 1, here is not intended to be limiting. The light source module 92, the circuit board 93, and the image sensing module 1 are disposed in the casing 91. The light source module 92 and the image sensing module 1 are electrically connected with the circuit board 93. In some embodiments, the light source module 92 may include a light emitting element 921 and a light-guide element 922. The light emitting element 921, for example, may be disposed on one side of the light-guide element 922. The light-guide element 922 may transform the light emitted from the light emitting element 921 into a linear light source. Further, the image sensor device 9, for example, may be a linear contact image sensing device. The contact image sensing device is used to scan planar image, text, or document into electronic format to facilitate storing, displaying, or transmitting. The contact image sensing device is mainly applied to desktop scanner, portable scanner, facsimile machine, and multifunctional printer, copier machine, etc.

The image sensing module 1 includes a substrate 11, an optical sensing element 12, and a light-guide component 13. The substrate 11, for example, is a strip-type (or elongated) substrate. The substrate 11 has a major axis corresponding to the major axis of the light source module 92. The substrate 11 may be semiconductor substrate, for example, silicon substrate, here is not intended to be limiting.

The optical sensing element 12 is disposed on the substrate 11. The image sensing module 1 may include one optical sensing element 12 or a plurality of optical sensing elements 12, here is not intended to be limiting. In the present embodiment, taking the image sensing module 1 including a plurality of optical sensing elements 12 as an example, here is not intended to be limiting. In some embodiments, the optical sensing elements 12 may be linearly disposed on the substrate 11. In other words, the optical sensing elements 12 are arranged along the major axis A1 of the substrate 11. It is worth mentioning that the distances between the optical sensing elements 12 are not limited, and the distances may be different according to different requirements. The optical sensing element 12, for example, may be photosensitive element, such as photodiode, here is not intended to be limiting.

The light-guide component 13 is disposed on the optical sensing element 12. The light-guide component 13 includes a first light adjusting layer 131 and a second light adjusting layer 132. The second light adjusting layer 132 is disposed on the first light adjusting layer 131. Further, the first light adjusting layer 131 and the second light adjusting layer 132 are collectively structured to be the light adjusting structure LA1. The first light adjusting layer 131 has a first light transmitting region 131A. The second light adjusting layer 132 has a second light transmitting region 132A.

The first light transmitting region 131A and the second light transmitting region 132A are disposed corresponding to the optical sensing elements 12. It is worth mentioning that, apart from the light transmitting region 131A and 132A, the first light adjusting layer 131 and the second light adjusting layer 132 may further include light shielding regions 131B and 132B, respectively. The light shielding regions 131B and 132B are disposed on peripheries of the light transmitting regions 131A and 132A. The first light transmitting region 131A, for example, is a plurality openings defined on the first light adjusting layer 131, the second light transmitting region 132A is a plurality openings defined on the second light adjusting layer 132, and the openings of the first light transmitting region 131A and the openings of the second light transmitting region 132A are aligned with each other. For example, the openings of the first light transmitting region 131A and the openings of the second light transmitting region 132A are aligned with each other by central axes. In some other embodiments, the openings of the first light transmitting region 131A and the openings of the second light transmitting region 132A may be slightly deviated from each other by central axes, but all of the openings are required to be located corresponding to the position of the optical sensing elements 12. The light shielding regions 131B and 132B are the portions other than the openings on the first light adjusting layer 131 and the second light adjusting layer 132.

Moreover, in the present embodiment, one opening of the first light transmitting region 131A and one opening of the second light transmitting region 132A are collectively defined corresponding to one optical sensing element 12, here is not intended to be limiting. For example, two or more than two openings of the first light transmitting region 131A and two or more than two openings of the second light transmitting region 132A may also be collectively defined corresponding to one optical sensing element 12.

In some embodiments, the light adjusting structure LA1 may be formed on the substrate 11 by semiconductor manufacturing process. For example, the first light adjusting layer 131 of light shielding material is firstly coated (or deposited) on the substrate 11 and the optical sensing element 12, and the openings of the first light transmitting region 131A are formed by etching. Then, after forming light transmitting material 14 on the first light adjusting layer 131, the second light adjusting layer 132 of light shielding material is coated (or deposited) on the light transmitting material 14. Similarly, the openings of the second light transmitting region 132A are formed by etching. Light transmitting material 14 may be further formed on the second light adjusting layer 132, and planarization process or thinning process may be used to make the upper surface of the light transmitting material 14 and the upper surface of the second light adjusting layer 132 be coplanar. Finally, the protective layer 15 is formed on the light transmitting material 14 and the second light adjusting layer 132. The disclosure is limited to the aforementioned manufacturing process, different manufacturing processes may be used depending on different requirements. Further, thickness of the first light adjusting layer 131, thickness of the second light adjusting layer 132, and thickness of the light transmitting material 14 are not limited.

In some embodiments, the first light transmitting region 131A has a first aperture AP1, the second light transmitting region 132A has a second aperture AP2, and the second aperture AP2 is equal to or greater than the first aperture AP1. In the present embodiments, taking the second aperture AP2 greater than the first aperture AP1 as an example, here is not intended to be limiting.

Therefore, when the light enters the light-guide component 13 along the light incident direction L, the light transmitting regions 131A, 132A of the first light adjusting layer 131 and the second light adjusting layer 132 may only allow the light with specific angle (for example, vertical to the light incident surface) entering the optical sensing element 12 along the light incident direction L, and the stray light is shielded by the light shielding regions 131B, 132B. In other words, the light-guide component 13 may be functioned as collimator, and the light transmitting regions 131A, 132A of the first light adjusting layer 131 and the second light adjusting layer 132 may be structured as the aperture structure.

In summary, the image sensing module 1 in the present embodiment may shield the stray light by the light-guide component 13 functioning as the collimator, and only the light with specific angle is allowed to image (form image) on the optical sensing element 12 through the light transmitting regions 131A, 132A. Further, the imaging range of the optical sensing element 12 is increased by the light transmitting regions 131A, 132A of the light adjusting layers 131, 132 functioning as small aperture structure, and DOF of imaging on the optical sensing element 12 is effectively increased. Moreover, the light adjusting layers 131, 132, for example, may be formed on the optical sensing element 12 by semiconductor manufacturing process to further decrease overall volume and manufacturing cost.

Figure 3:
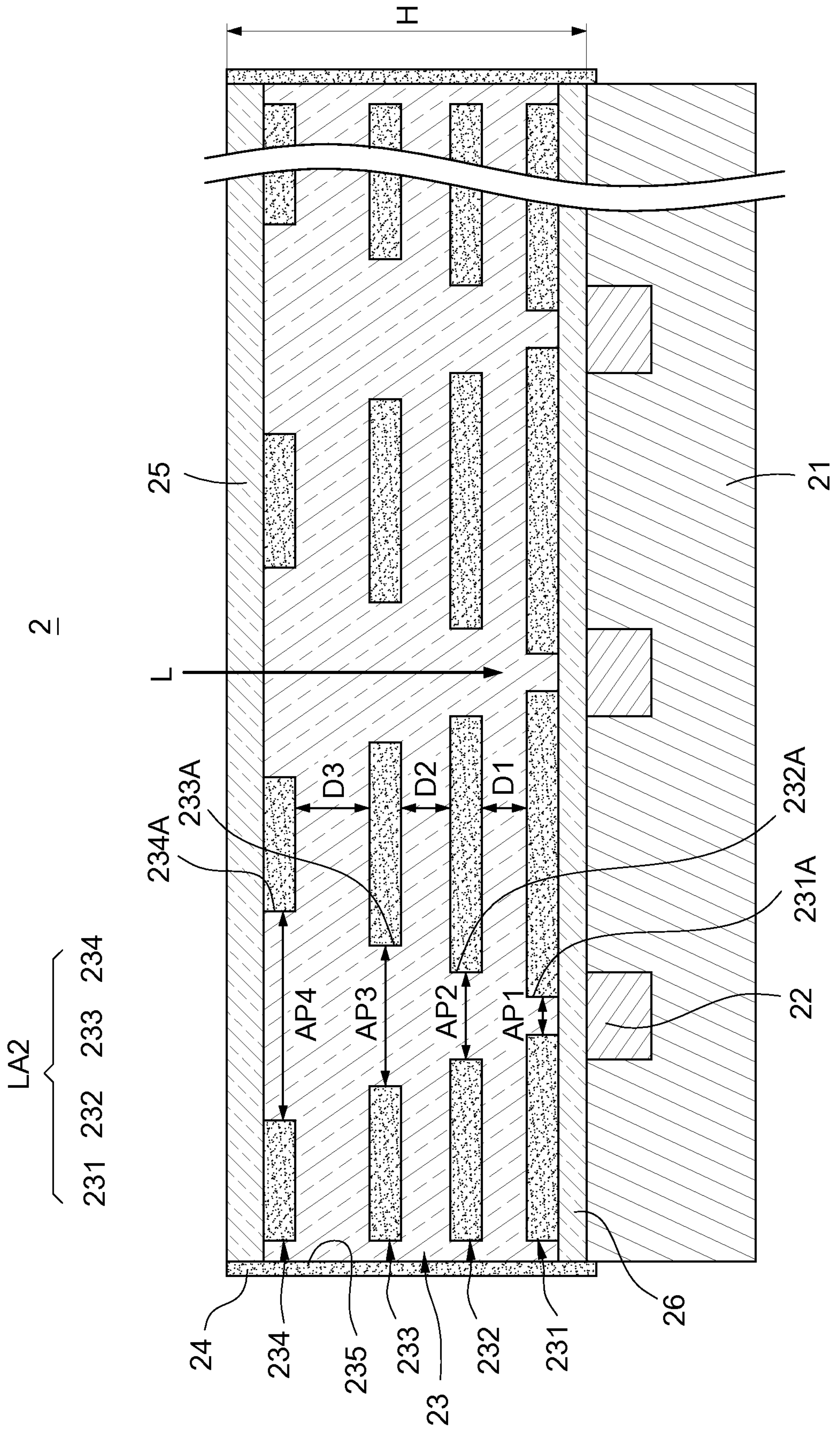
FIG. 3 is a cross-sectional diagram of the image sensing module in the second embodiment of the disclosure.

FIG. 3 is a cross-sectional diagram of the image sensing module 2 in the second embodiment of the disclosure. The difference between the image sensing module 2 of the second embodiment and the image sensing module 1 of the first embodiment is that the light-guide component 23 further includes a third light adjusting layer 233 disposed on the second light adjusting layer 232, and a fourth light adjusting layer 234 disposed on the third light adjusting layer 233. The third light adjusting layer 233 has a third light transmitting region 233A, and the fourth light adjusting layer 234 has a fourth light transmitting region 234A. The third light transmitting region 233A and the fourth light transmitting region 234A are disposed corresponding to the optical sensing elements 233, 234, respectively. It is worth mentioning that the light adjusting structure LA2 of the present embodiment uses four light adjusting layers 231, 232, 233, 234 as an example, here is not intended to be limiting. For example, the light adjusting structure LA2 may have three light adjusting layers, or have five or more than five light adjusting layers.

Similarly, the third light transmitting region 233A, for example, is a plurality openings defined on the third light adjusting layer 233, the fourth light transmitting region 234A is a plurality openings defined on the fourth light adjusting layer 234, and the openings of the third light transmitting region 233A and the openings of the fourth light transmitting region 234A are aligned with each other. For example, the openings of the first light transmitting region 231A, the second light transmitting region 232A, the third light transmitting region 233A, and the fourth light transmitting region 234A are aligned with each other by central axes. In some other embodiments, the openings of different light transmitting regions may be slightly deviated from each other by central axes, but all of the openings are required to be located corresponding to the position of the optical sensing elements 22.

In some embodiments, the third light transmitting region 233A has a third aperture AP3, the fourth light transmitting region 234A has a fourth aperture AP4. The second aperture AP2 is equal to or greater than the first aperture AP1, the third aperture AP3 is equal to or greater than the second aperture AP1, and the fourth aperture AP4 is equal to or greater than the third aperture AP3. In the present embodiments, taking the second aperture AP2 greater than the first aperture AP1, the third aperture AP3 greater than the second aperture AP2, and the fourth aperture AP4 greater than the third aperture AP3 as an example. In other words, the apertures AP1, AP2, AP3, AP4 of the light transmitting regions 231A, 232A, 233A, 234A are gradually decreased along the light incident direction L, here is not intended to be limiting.

In some embodiments, when the apertures AP1, AP2, AP3, AP4 are gradually decreased along the light incident direction L, the apertures AP1, AP2, AP3, AP4 may be in a predetermined ratio, for example, the ratio between AP1:AP2:AP3:AP4 may be 1.0-4.0:10.0-15.0:15.0-20.0:30.0-40.0. For example, the ratio between AP1:AP2:AP3:AP4 may be 1.0:10.0:15.0:30.0. For the other example, the ratio between AP1:AP2:AP3:AP4 may be 2.0:11.0:16.0:31.0. For the other example, the ratio between AP1:AP2:AP3:AP4 may be 2.1:12.0:17.0:32.0. For the other example, the ratio between AP1:AP2:AP3:AP4 may be 2.5:13.0:18.0:35.0. For the other example, the ratio between AP1:AP2:AP3:AP4 may be 2.4:12.0:18.0:37.0. For the other example, the ratio between AP1:AP2:AP3:AP4 may be 3.5:14.0:19.0:38.0. For the other example, the ratio between AP1:AP2:AP3:AP4 may be 4.0:15.0:20.0:40.0. Only part of the embodiments are listed as examples above, here is not intended to be limiting. The ratio between the apertures AP1, AP2, AP3, AP4 may be adjusted differently according to the requirements.

Figure 4:
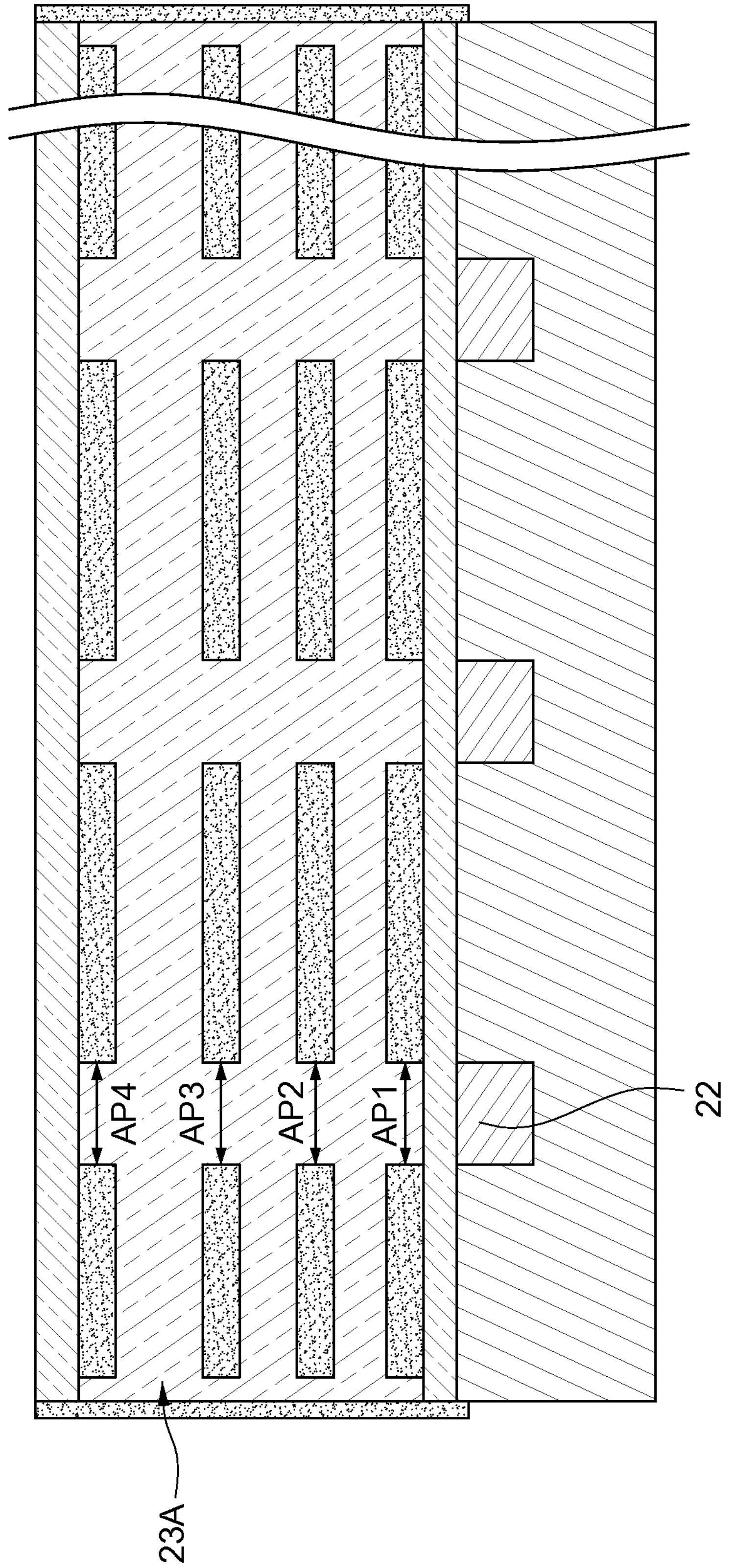
FIG. 4 is a cross-sectional diagram of the image sensing module in the various embodiment of the disclosure.

FIG. 4 is a cross-sectional diagram of the image sensing module 2A in the various embodiment of the disclosure. As shown in FIG. 4, the apertures AP1, AP2, AP3, AP4 may be the same. In other words, the second aperture A2 is equal to the first aperture AP1, the third aperture A3 is equal to the second aperture AP2, and the fourth aperture A4 is equal to the third aperture AP3. As a result, DOF of imaging on the optical sensing element 22 may also be effectively increased.

Referring back to FIG. 3, in some embodiments, the aperture AP1 and the height H (the overall height of the light-guide component 23, the protective layer 25 and the base layer 26, it should be noted that, if no protective layer 25 and base layer 26 are disposed, the height H is the overall height of the light-guide component 23) may be in a predetermined ratio. For example, the ratio between AP1:H may be 1.0-2.0:80.0-90.0. For example, the ratio between AP1:H may be 1.0:80.0. For the other example, the ratio between AP1:H may be 1.2:85.0. For the other example, the ratio between AP1:H may be 1.0:87.0. For the other example, the ratio between AP1:H may be 1.0:88.3. For the other example, the ratio between AP1:H may be 1.7:89.5. For the other example, the ratio between AP1:H may be 2.0:90.0. Only part of the embodiments are listed as examples above, here is not intended to be limiting. In other words, for example, if the ratio of AP1:H is low, the light acceptance is low, and the DOF is high. Similarly, if the ratio of AP1:H is high, the light acceptance is high, and the DOF is low. The ratio between the aperture AP1 and the height H may be adjusted differently according to the requirements.

Further, the first light adjusting layer 231 and the second light adjusting layer 232 may be spaced by the first distance D1, the second light adjusting layer 232 and the third light adjusting layer 233 may be spaced by the second distance D2, and the third light adjusting layer 233 and the fourth light adjusting layer 234 may be spaced by the third distance D3. The distances D1, D2, D3 (that is, the thickness of the light transmitting material between the light adjusting layers) may be the same or different. In some embodiments, the distances D1, D2, D3 are different, and the distances D1, D2, D3 may be in a predetermined ratio. For example, the ratio between D1:D2:D3 may be 50.0-70.0:40.0-60.0:120.0-140.0. For example, the ratio between D1:D2:D3 may be 50.0:40.0:120.0. For the other example, the ratio between D1:D2:D3 may be 60.0:45.0:125.0. For the other example, the ratio between D1:D2:D3 may be 68.4:42.2:137.0. For the other example, the ratio between D1:D2:D3 may be 70.0:55.6:130.5. For the other example, the ratio between D1:D2:D3 may be 58.0:60.0:140.0. In other words, the distances (D1, D2, D3) and the ratios may be adjusted for blocking stray light paths between neighboring optical sensing elements. Only part of the embodiments are listed as examples above, here is not intended to be limiting. The ratio between the distances D1, D2, D3 may be adjusted differently according to the requirements.

Figure 5:
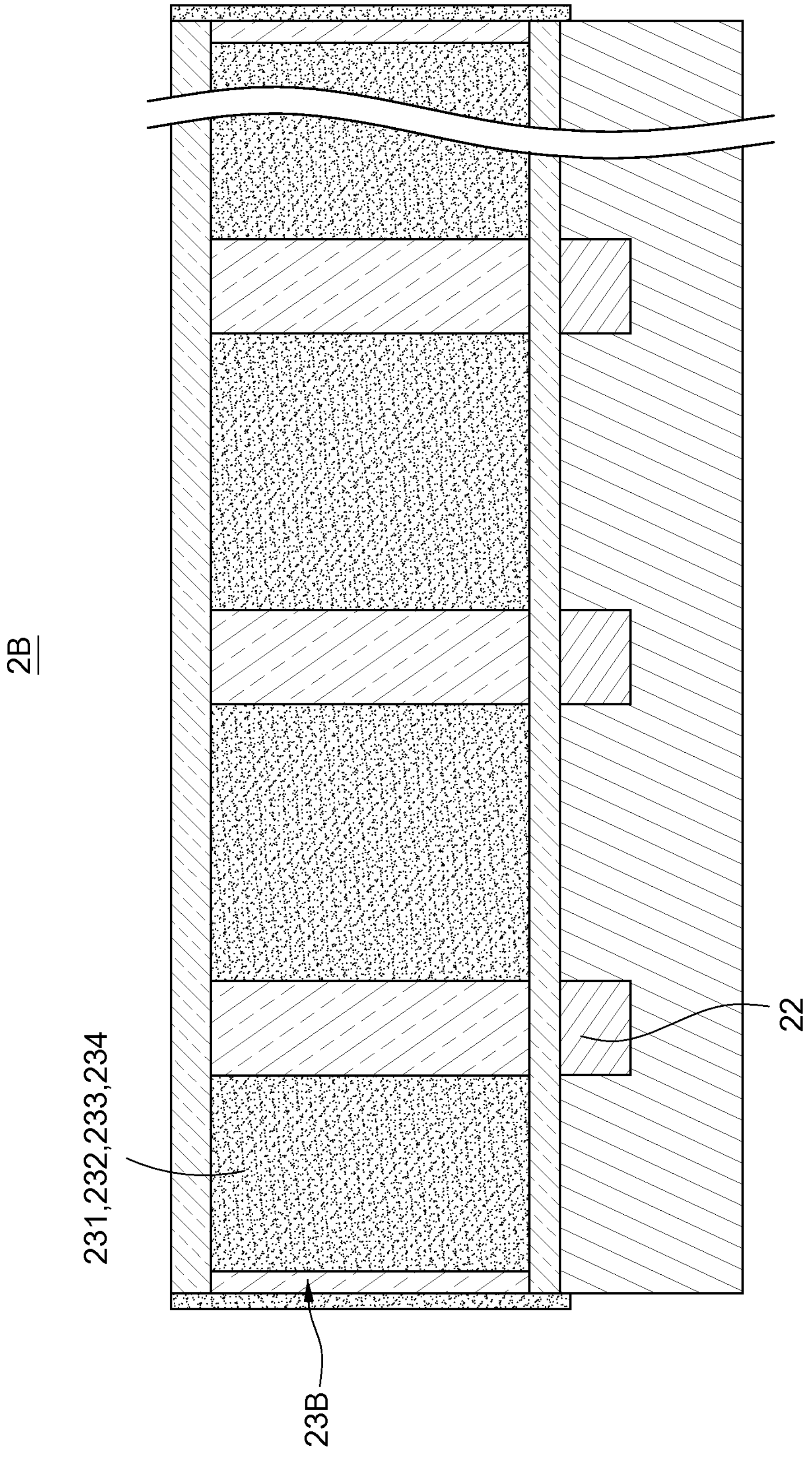
FIG. 5 is a cross-sectional diagram of the image sensing module in the various embodiment of the disclosure.

FIG. 5 is a cross-sectional diagram of the image sensing module 2B in the various embodiment of the disclosure. As shown in FIG. 5, there may be no distance between the light adjusting layers 231, 232, 233, 234. In other words, the distance between any adjacent two of the light adjusting layers 231, 232, 233, 234 is zero. The light adjusting layers 231, 232, 233, 234 may be formed at different manufacturing process stages (that is, being formed respectively), or formed by single manufacturing process stage (that is, being formed continuously). As a result, the manufacturing difficulty of the light-guide component 23B may be decreased under the requirement of effectively increasing DOF of imaging on the optical sensing element 22.

Referring back to FIG. 3, in some embodiments, the image sensing module 2 may further include a light shielding layer 24 disposed on two sides 235 of the light-guide component 23, respectively. The light shielding layer 24 may be, for example, the black coating (film) or paint. The light shielding layers 24 may be disposed on two sides 235 of the light-guide component 23 to shield sideways stray light. As a result, the stray light may be blocked around the outer perimeter of the light-guide component 23 (functioning as the collimator), or the light adjusting structure LA2. Further, DOF of imaging on the optical sensing element 22 may be effectively increased through lowering the stray light.

In some embodiments, the image sensing module 2 may include the base layer 26 disposed between the light-guide component 23 and the substrate. The base layer 26 is made of, for example, light transmitting material. The manufacturing process of the image sensing module 2 may be divided into first stage and second stage by the base layer 26. That is, after the process of disposing the optical sensing elements 22 on the substrate 21, the base layer 26 is formed on the substrate 21 and the optical sensing elements 22 in advance, and the light-guide component 23 is formed on the base layer 26. In some embodiments, the protective layer 25 may be further formed on the light-guide component 23. As a result, the optical sensing elements 22 and the light-guide component 23 may be formed by different semiconductor manufacturing process. The disclosure is not limited to the aforementioned process, different manufacturing process may be used depending on different requirements.

In summary, the image sensing module 2 in the present embodiment may shield the stray light by the light-guide component 23 functioning as the collimator, and only the light with specific angle is allowed to image (form image) on the optical sensing element 22 through the light transmitting regions 231A, 232A, 233A, 234A. Further, the imaging range of the optical sensing element 22 is increased by the light transmitting regions 231A, 232A, 233A, 234A of the light adjusting layers 231, 232, 233, 234 functioning as small aperture structure, and DOF of imaging on the optical sensing element 22 is effectively increased. Moreover, the light adjusting layers 231, 232, 233, 234, for example, may be formed on the optical sensing element 22 by semiconductor manufacturing process to further decrease overall volume and manufacturing cost. Further, the image sensing module 2 may shield the sideways stray light through the light shielding layer 24, and DOF of imaging on the optical sensing element 22 may be effectively increased through lowering the stray light. The optical sensing elements 22 and the light-guide component 23 of the image sensing module 2 may further be formed by different semiconductor manufacturing process by the base layer 26.

Figure 6A:
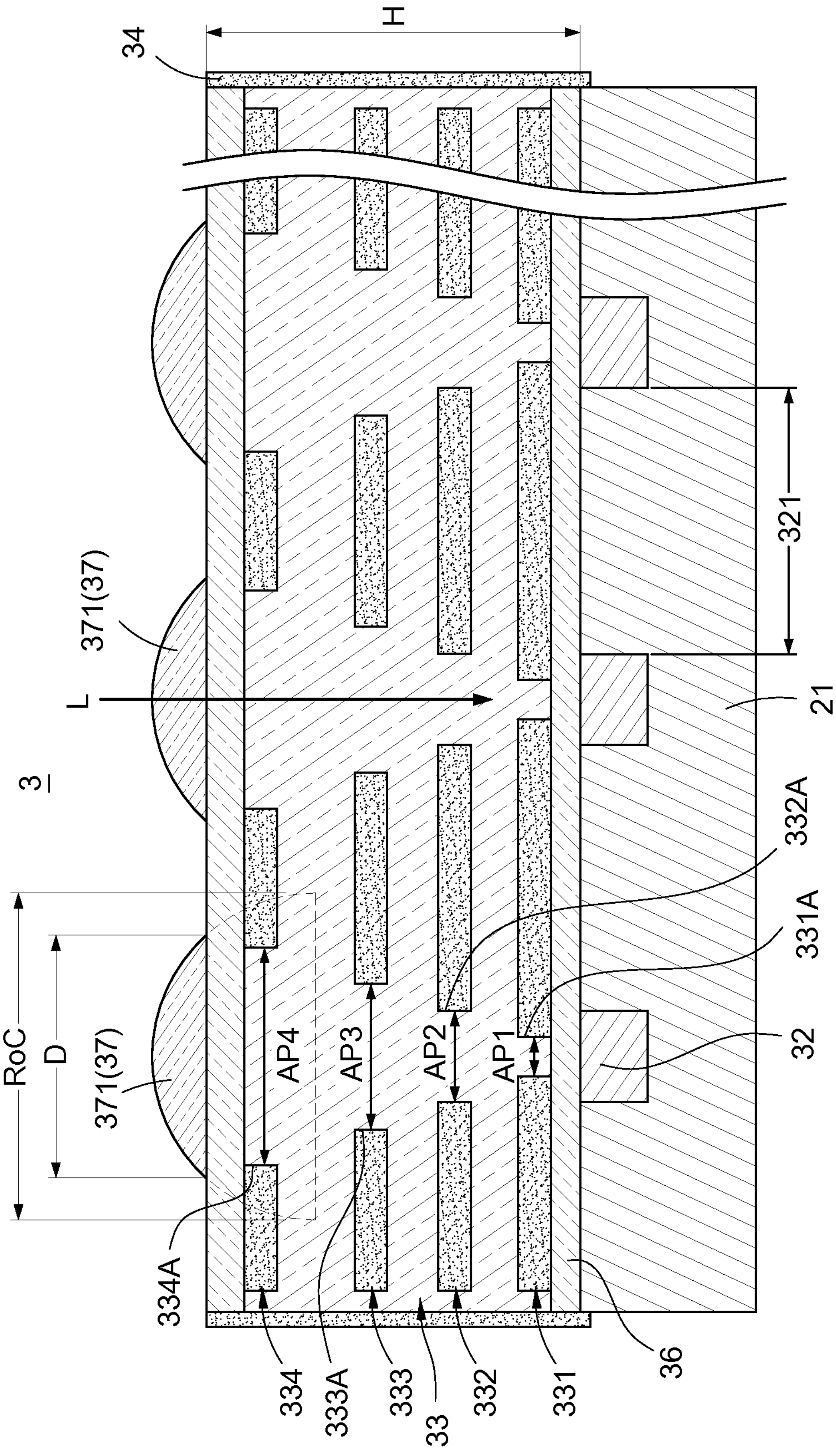
FIG. 6A is a cross-sectional diagram of the image sensing module in the third embodiment of the disclosure.
Figure 6B:
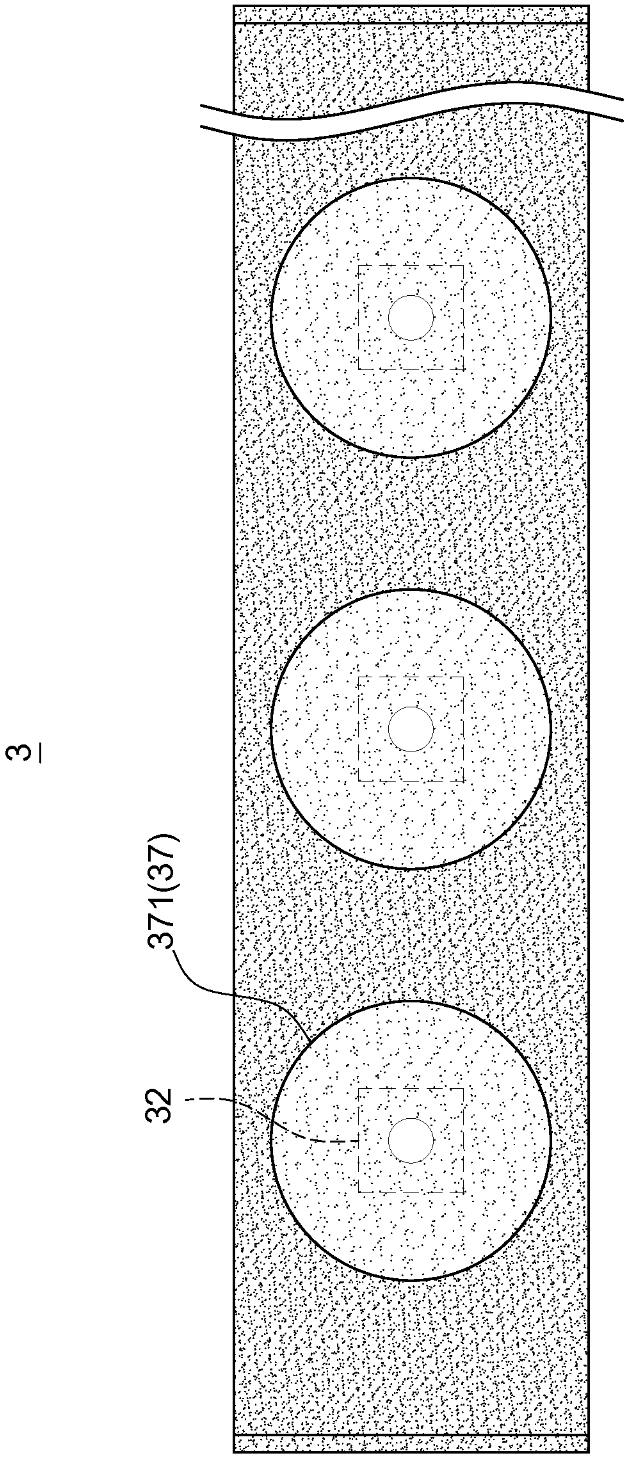
FIG. 6B is a top view of the image sensing module in the third embodiment of the disclosure.

FIG. 6A is a cross-sectional diagram of the image sensing module 3 in the third embodiment of the disclosure. FIG. 6B is a top view of the image sensing module 3 in the third embodiment of the disclosure. As shown in FIG. 6A and FIG. 6B, the difference between the image sensing module 3 of the third embodiment and the image sensing module 2 of the second embodiment is that the image sensing module 3 further includes a lens layer 37 disposed on the light-guide component 33. The lens layer 37 includes a plurality of lens elements 371. The lens elements 371 are disposed corresponding to the optical sensing elements 32 or the light transmitting regions 331A, 332A, 333A, 334A. In other words, each lens element 371 may be disposed corresponding to each optical sensing element 32, but not corresponding to the light transmitting regions 331A, 332A, 333A, 334A. In some other embodiments, each lens element 371 may be disposed corresponding to the light transmitting regions 331A, 332A, 333A, 334A, but not corresponding to each optical sensing element 32. It should be noted that each lens element 371 may also be disposed corresponding to each optical sensing element 32 and the light transmitting regions 331A, 332A, 333A, 334A.

The lens elements 371 and the openings of the light transmitting regions 331A, 332A, 333A, 334A are aligned with each other. For example, the lens elements 371 and the openings of the light transmitting regions 331A, 332A, 333A, 334A are aligned with each other by central axes. Further, in the present embodiment, one lens element 371 and one opening of the light transmitting regions 331A, 332A, 333A, 334A are collectively arranged corresponding to one optical sensing element 32, here is not intended to be limiting. For example, two lens elements 371 and two openings of the light transmitting regions 331A, 332A, 333A, 334A may be collectively arranged corresponding to one optical sensing element 32.

In some embodiments, radius RoC of curvature of the lens element 371 and the height H (the overall height of the light-guide component 23, the protective layer 25 and the base layer 26) may be in a predetermined ratio. For example, the ratio between Roc:H may be 1.00-2.00:2.00-3.00. For example, the ratio between Roc:H may be 1.00:2.00. For the other example, the ratio between Roc:H may be 1.15:2.50. For the other example, the ratio between Roc:H may be 1.00:2.70. For the other example, the ratio between Roc:H may be 1.00:2.83. For the other example, the ratio between Roc:H may be 1.50:3.00. For the other example, the ratio between Roc:H may be 2.00:3.00. Only part of the embodiments are listed as examples above, here is not intended to be limiting. In other words, the relationship between radius RoC of curvature of the lens element 371 and the height H may be concluded as the lens design equation below, $$H=\mathrm{RoC}/(n-1),$$

where n is the index of refraction of the light transmitting layers. It should be noted that the RoC:H ratio is not really adjustable, it is determined by the index (n) of the light transmitting layers (or the collimator material). The ratio between the radius RoC of curvature and the height H may be adjusted differently according to the requirements In some embodiments, diameter D of arc of the lens element 371 and the maximum aperture (for example, the aperture AP4) may be less than or equal to the distance 321 between any adjacent two optical sensing elements 32. For example, diameter D of arc of the lens element 371 may be 30.0 μm-40.0 μm, the distance 321 between any adjacent two optical sensing elements 32 may be 40.0 μm-50.0 μm. For the other example, diameter D of arc of the lens element 371 may be 30.0 μm, the distance 321 between any adjacent two optical sensing elements 32 may be 40.0 μm. For the other example, diameter D of arc of the lens element 371 may be 35.2 μm, the distance 321 between any adjacent two optical sensing elements 32 may be 43.7 μm. For the other example, diameter D of arc of the lens element 371 may be 40.0 μm, the distance 321 between any adjacent two optical sensing elements 32 may be 40.0 μm. For the other example, diameter D of arc of the lens element 371 may be 39.0 μm, the distance 321 between any adjacent two optical sensing elements 32 may be 42.3 μm. For the other example, diameter D of arc of the lens element 371 may be 38.5 μm, the distance 321 between any adjacent two optical sensing elements 32 may be 44.6 μm. Only part of the embodiments are listed as examples above, here is not intended to be limiting. The diameter D of arc, the maximum aperture and the distance 321 may be adjusted differently according to the requirements.

In summary, the image sensing module 3 in the present embodiment may shield the stray light by the light-guide component 33 functioning as the collimator, and only the light with specific angle is allowed to image (form image) on the optical sensing element 32 through the light transmitting regions 331A, 332A, 333A, 334A. Further, the imaging range of the optical sensing element 32 is increased by the light transmitting regions 331A, 332A, 333A, 334A of the light adjusting layers 331, 332, 333, 334 functioning as small aperture structure, and DOF of imaging on the optical sensing element 32 is effectively increased. Moreover, the light adjusting layers 331, 332, 333, 334, for example, may be formed on the optical sensing element 32 by semiconductor manufacturing process to further decrease overall volume and manufacturing cost. Further, the image sensing module 3 may shield the sideways stray light through the light shielding layer 34, and DOF of imaging on the optical sensing element 32 may be effectively increased through lowering the stray light. The optical sensing elements 32 and the light-guide component 33 of the image sensing module 3 may further be formed by different semiconductor manufacturing process by the base layer 36. Moreover, the lens elements 371 of the lens layer 37 may aggregate the incident light to further increase the amount of incident light and increase DOF of imaging on the optical sensing element 32 without increasing overall volume and manufacturing cost.

Figure 7A:
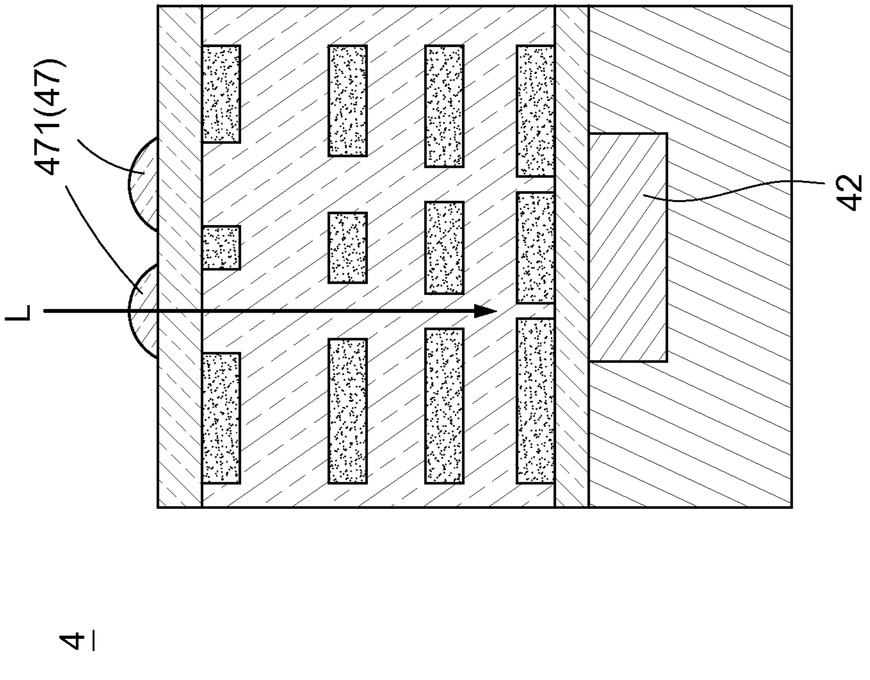
FIG. 7A is a cross-sectional diagram of the image sensing module in the fourth embodiment of the disclosure along the line B-B in FIG. 7B.
Figure 7B:
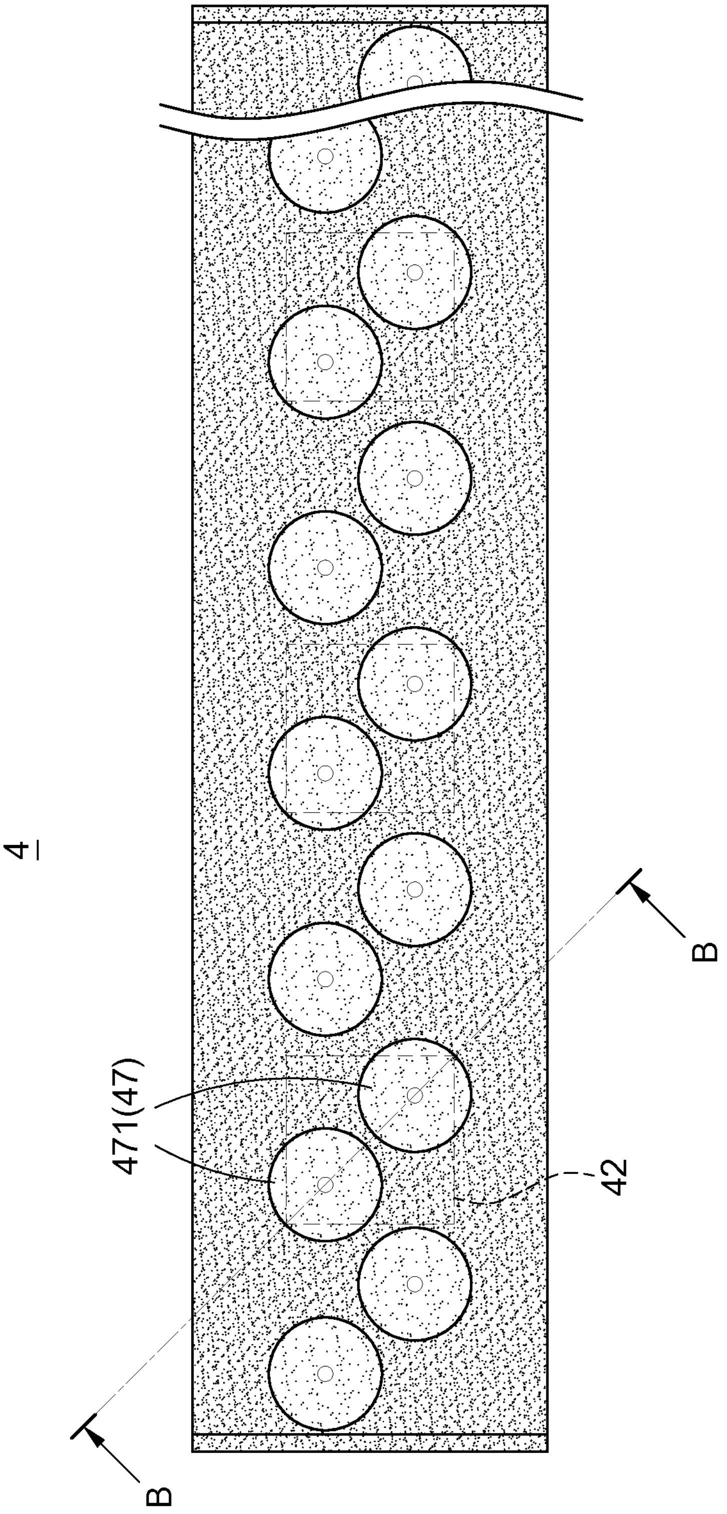
FIG. 7B is a top view of the image sensing module in the fourth embodiment of the disclosure.

FIG. 7A is a cross-sectional diagram of the image sensing module 4 in the fourth embodiment of the disclosure along the line B-B in FIG. 7B. FIG. 7B is a top view of the image sensing module 4 in the fourth embodiment of the disclosure. As shown in FIG. 7A and FIG. 7B, the difference between the image sensing module 4 of the fourth embodiment and the image sensing module 3 of the third embodiment is that the lens elements 471 of the lens layer 47 are alternately arranged with each other, and each optical sensing element 42 is arranged corresponding to at least two lens elements 471. Alternate arrangement indicates that, for example, the lens elements 471 are divided into upper row and lower row, and the lens elements 471 in the upper row and the lens elements 471 in the lower row are staggered by central axes. Further, in the present embodiment, taking one optical sensing element 42 arranged corresponding to two lens elements 471 as an example, here is not intended to be limiting. It should be noted that some lens elements may be arranged without aligning with any optical sensing element.

As a result, the lens elements 471 may aggregate the incident light to further increase the amount of incident light and increase DOF of imaging on the optical sensing element 42 without increasing overall volume and manufacturing cost.

Figure 8:
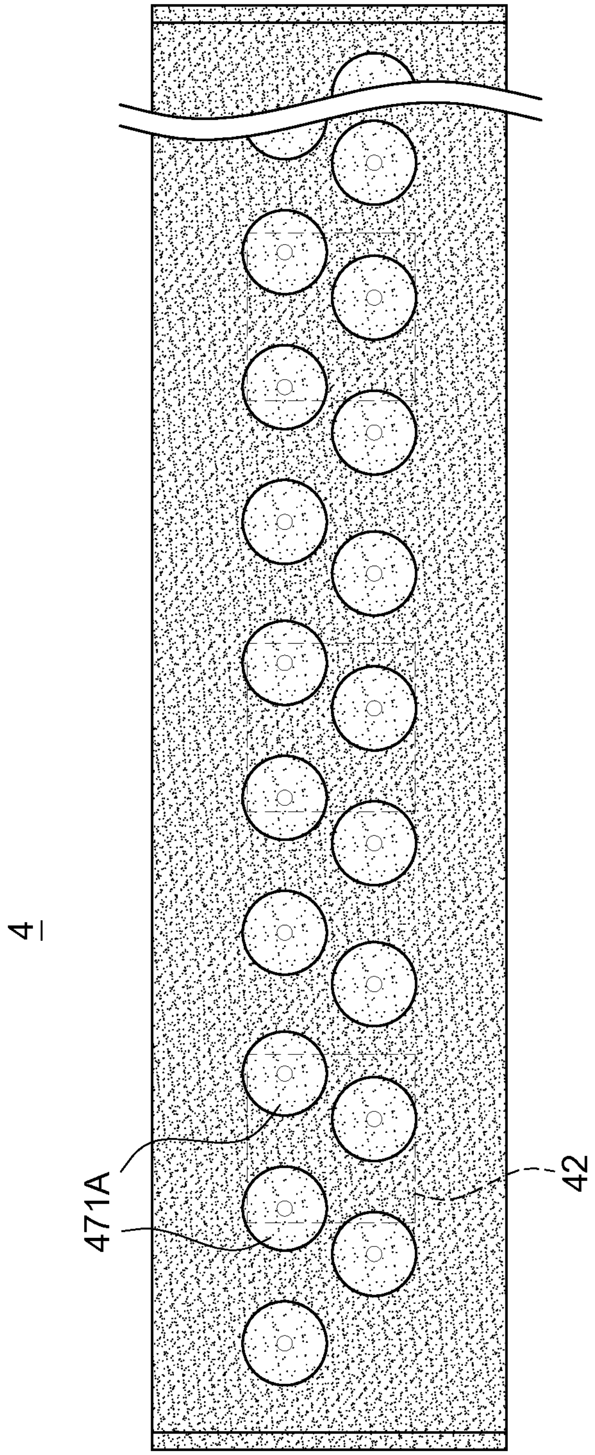
FIG. 8 is a top view of the image sensing module in the various embodiment of the disclosure.

FIG. 8 is a top view of the image sensing module 4A in the various embodiment of the disclosure. As shown in FIG. 8, one optical sensing element 42 may be arranged corresponding to three lens elements 471A. It is worth mentioning that one optical sensing element 42 may also be arranged corresponding to four or more than four lens elements according to different designs. It should be noted that some lens elements may be arranged without aligning with any optical sensing element.

In summary, the image sensing module in the disclosure may shield the stray light by the light-guide component functioning as the collimator, and only the light with specific angle is allowed to image (form image) on the optical sensing element through the light transmitting regions. Further, perpendicularly acceptable range for forming image of the optical sensing element is increased by the light transmitting regions of the light adjusting layers functioning as small aperture structure to limit (or decrease) the incident angle to the optical sensing element, and DOF of imaging on the optical sensing element is effectively increased. Moreover, in order to form the light-guide component onto the substrate containing the optical sensing elements with the benefit of assuring precise alignment of each optical sensing element to the corresponding light-guide component (that is, apertures), the light adjusting layers, for example, may be formed on the optical sensing element by semiconductor manufacturing process to further decrease overall volume and manufacturing cost. Further, the image sensing module may shield the sideways stray light through the light shielding layer to increase DOF of imaging on the optical sensing element. Similarly, the optical sensing elements and the light-guide component of the image sensing module may further be formed by different semiconductor manufacturing process by the base layer. Moreover, the lens elements may aggregate the incident light to further increase the amount of incident light and increase DOF of imaging on the optical sensing element without increasing overall volume and manufacturing cost.

While this disclosure has been described by means of specific embodiments, numerous modifications and variations may be made thereto by those skilled in the art without departing from the scope and spirit of this disclosure set forth in the claims.

What is claimed is:

1. An imaging sensing module, comprising:

a substrate;

an optical sensing element, disposed on the substrate; and a light-guide component, disposed on the optical sensing element, comprising a first light adjusting layer and a second light adjusting layer, the second light adjusting layer disposed on the first light adjusting layer, the first light adjusting layer comprising a first light transmitting region, and the second light adjusting layer comprising a second light transmitting region, wherein the first light transmitting region and the second light transmitting region are disposed corresponding to the optical sensing element, and wherein the first light adjusting layer and the second light adjusting layer are spaced by a first distance.

2. The imaging sensing module according to claim 1, further comprising:

a lens layer, disposed on the light-guide component, and comprising a lens element, wherein the lens element is disposed corresponding to the optical sensing element, or disposed corresponding to the first light transmitting region and the second light transmitting region.

3. The imaging sensing module according to claim 2, wherein the lens element is disposed corresponding to the optical sensing element.

4. The imaging sensing module according to claim 2, wherein the lens layer comprises a plurality of the lens elements, the lens elements are arranged alternately, and the optical sensing element is disposed corresponding to at least two of the lens elements.

5. The imaging sensing module according to claim 1, wherein the first light transmitting region comprises a first aperture, the second light transmitting region comprises a second aperture, and the second aperture is equal to or greater than the first aperture.

6. The imaging sensing module according to claim 1, wherein the light-guide component further comprises a third light adjusting layer disposed on the second light adjusting layer, the third light adjusting layer comprises a third light transmitting region, and the third light transmitting region is disposed corresponding to the optical sensing element.

7. The imaging sensing module according to claim 6, wherein the first light transmitting region comprises a first aperture, the second light transmitting region comprises a second aperture, the third light transmitting region comprises a third aperture, the second aperture is equal to or greater than the first aperture, and the third aperture is equal to or greater than the second aperture.

8. The imaging sensing module according to claim 6, wherein the first light adjusting layer and the second light adjusting layer are spaced by a first distance, and the second light adjusting layer and the third light adjusting layer are spaced by a second distance.

9. An imaging sensing module, comprising:

a substrate;

an optical sensing element, disposed on the substrate; and a light-guide component, disposed on the optical sensing element, comprising a light adjusting structure, the light adjusting structure comprising a plurality of light transmitting regions, and the light transmitting regions are disposed corresponding to the optical sensing element, wherein an aperture of each light transmitting region is gradually decreased along a light incident direction.

10. The imaging sensing module according to claim 9, further comprising:

a lens layer, disposed on the light-guide component, and comprising a plurality of lens elements, wherein the lens elements are respectively disposed corresponding to the optical sensing element.

11. The imaging sensing module according to claim 10, wherein each lens element is disposed corresponding to the optical sensing element.

12. The imaging sensing module according to claim 10, wherein the lens elements are arranged alternately, and the optical sensing element is disposed corresponding to at least two of the lens elements.

13. The imaging sensing module according to claim 9, wherein the light adjusting structure comprises a plurality of light adjusting layers, the light adjusting layers are arranged along the light incident direction, and the light transmitting regions are disposed on the light adjusting layers.

14. The imaging sensing module according to claim 13, wherein two of the light adjusting layers adjacent to each other are spaced by a distance.

15. The imaging sensing module according to claim 14, wherein a plurality of distances is in a predetermined ratio with one another.

16. An imaging sensing module, comprising:

a substrate;

an optical sensing element, disposed on the substrate;

a light-guide component, disposed on the optical sensing element, comprising a light adjusting layer, the light adjusting layer comprising a plurality of light transmitting regions and a light shielding region, the light shielding region is disposed on peripheries of the light transmitting regions, and each light transmitting region is disposed corresponding to the optical sensing element; and a lens layer, disposed on the light-guide component, and comprising a plurality of lens elements, wherein the lens elements are respectively disposed corresponding to the optical sensing element.

17. The imaging sensing module according to claim 16, wherein each lens element is disposed corresponding to the optical sensing element.

18. The imaging sensing module according to claim 16, wherein the lens elements are arranged alternately, and the optical sensing element is disposed corresponding to at least two of the lens elements.

* * * * *